(12) United States Patent
Bareis et al.

(10) Patent No.: US 10,359,138 B2
(45) Date of Patent: Jul. 23, 2019

(54) CONTROL DEVICE FOR THE COOLANT FLOW IN A COOLING CIRCUIT OF AN INTERNAL COMBUSTION ENGINE

(71) Applicant: BorgWarner Ludwigsburg GmbH, Ludwigsburg (DE)

(72) Inventors: Bernd Bareis, Täferrot-Utzstetten (DE); Markus Auer, Stuttgart (DE); Christian Herrmann, Stuttgart (DE); Nicolai Halder, Stuttgart (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 256 days.

(21) Appl. No.: 15/583,562

(22) Filed: May 1, 2017

(65) Prior Publication Data
US 2017/0321830 A1    Nov. 9, 2017

(30) Foreign Application Priority Data

May 3, 2016   (DE) .......................... 10 2016 108 227
Sep. 1, 2016   (DE) .......................... 10 2016 116 361

(51) Int. Cl.
*F16L 21/03*    (2006.01)
*F16J 15/02*    (2006.01)
*F01P 7/14*     (2006.01)

(52) U.S. Cl.
CPC .............. *F16L 21/03* (2013.01); *F01P 7/14* (2013.01); *F16J 15/025* (2013.01); *F01P 2007/143* (2013.01)

(58) Field of Classification Search
CPC ........ F16L 21/03; F01P 7/14; F01P 2007/143; F01P 2007/146; F16J 15/025;
(Continued)

(56) References Cited

U.S. PATENT DOCUMENTS

2008/0202607 A1*  8/2008  Hegberg ................... F16K 3/12
                                                        137/553
2009/0114169 A1   5/2009  Heldberg et al.

FOREIGN PATENT DOCUMENTS

DE         101 01 826 A1    7/2002
DE    10 2006 038 213 A1    2/2008
(Continued)

*Primary Examiner* — Hung Q Nguyen
(74) *Attorney, Agent, or Firm* — Bose McKinney & Evans LLP

(57) ABSTRACT

This disclosure pertains to a control device for the coolant flow in a cooling circuit of an internal combustion engine with the following characteristics: a housing with an inlet opening, an outlet opening and a movable control element for varying the flow-through cross section of the channel; an annular seal arrangement comprising a sealing frame and a sealing ring is seated between a sealing surface of the housing and a sealing surface of the control element. According to this disclosure, it is proposed that the sealing ring rests against a plane sealing surface of the housing in a sealing fashion and meets this plane sealing surface along a contact line that encloses a first surface area. Depending on the flow direction through the seal arrangement, the sealing ring features a surface section that has a defined circumference referred to the length of the contact line between the sealing ring and the housing. The sealing surface of the sealing frame is perpendicularly projected into a plane of projection and thereby has an inner and/or outer boundary line, which respectively encloses a second or third surface area that has a certain relation to the first surface area.

20 Claims, 5 Drawing Sheets

(58) Field of Classification Search
CPC ...... F16K 1/226; F16K 1/2263; F16K 1/2265;
F16K 1/2268; F16K 1/228; F16K 3/02;
F16K 3/12; F16K 3/14; F16K 3/16
See application file for complete search history.

(56) References Cited

FOREIGN PATENT DOCUMENTS

EP         2 295 757 A1     3/2011
JP         2013245738 A  * 12/2013  ............... F01P 7/14

* cited by examiner

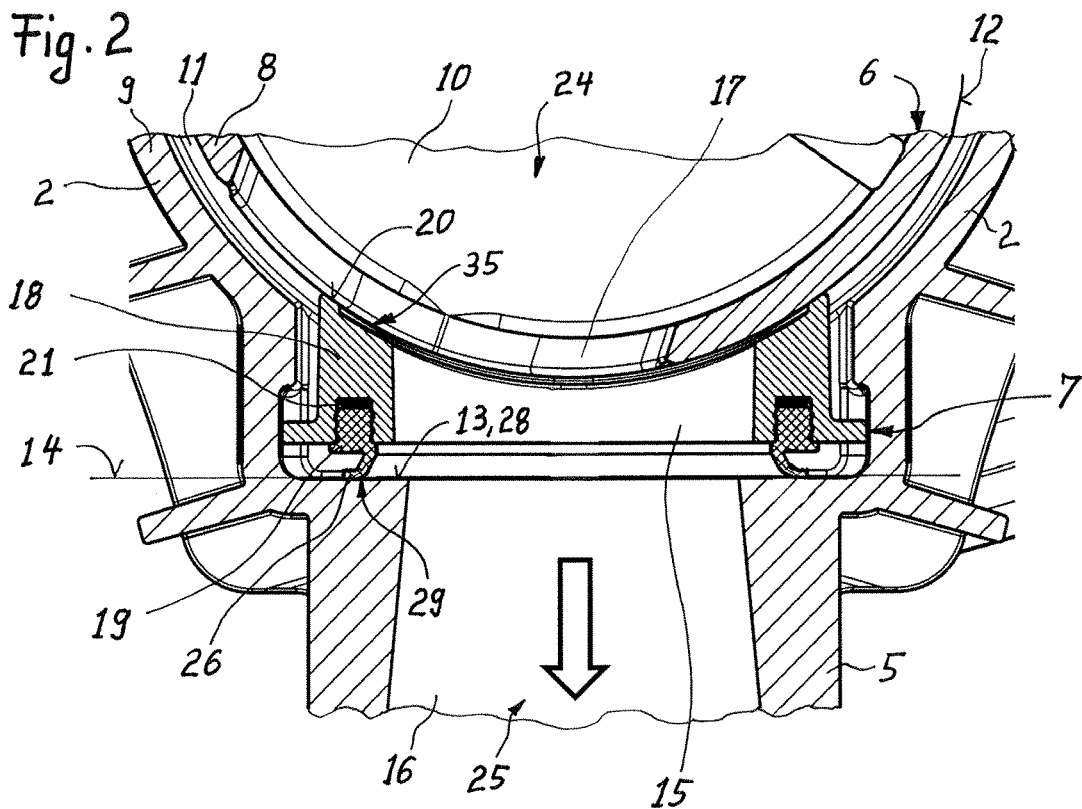
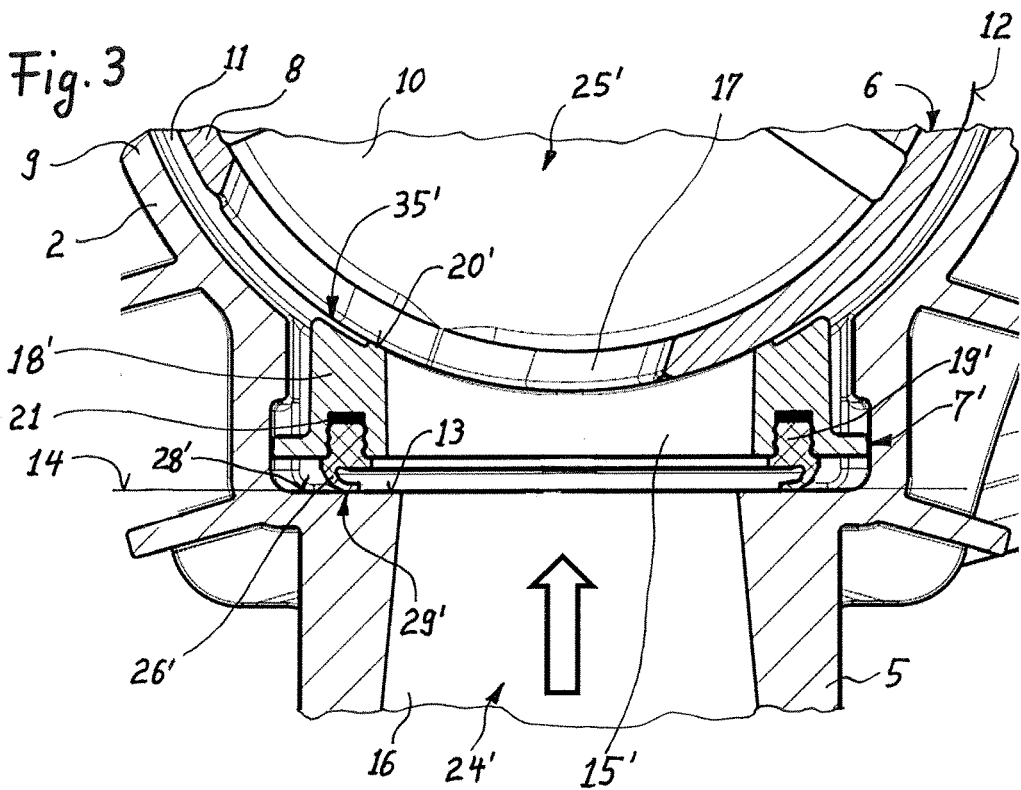

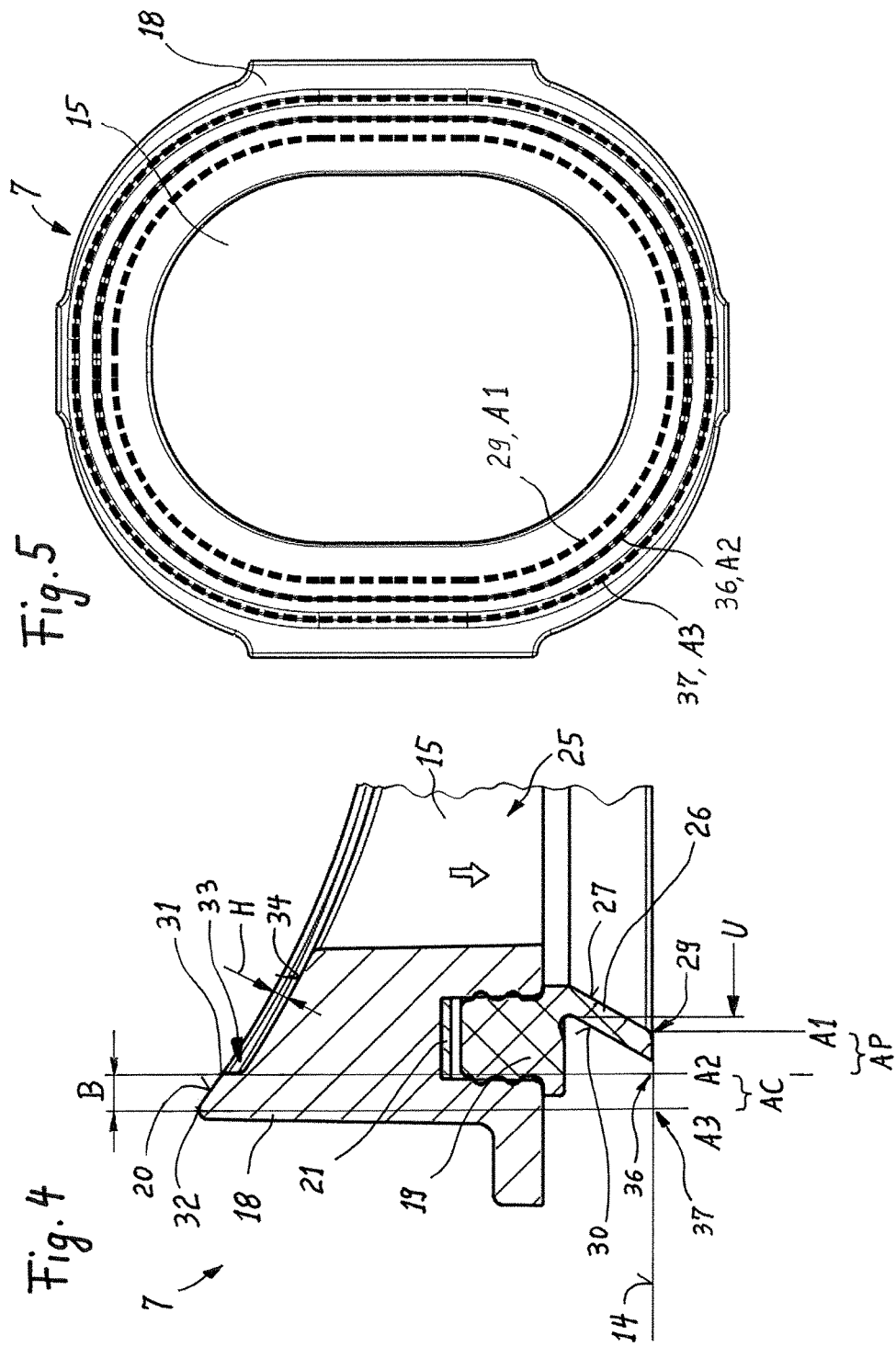

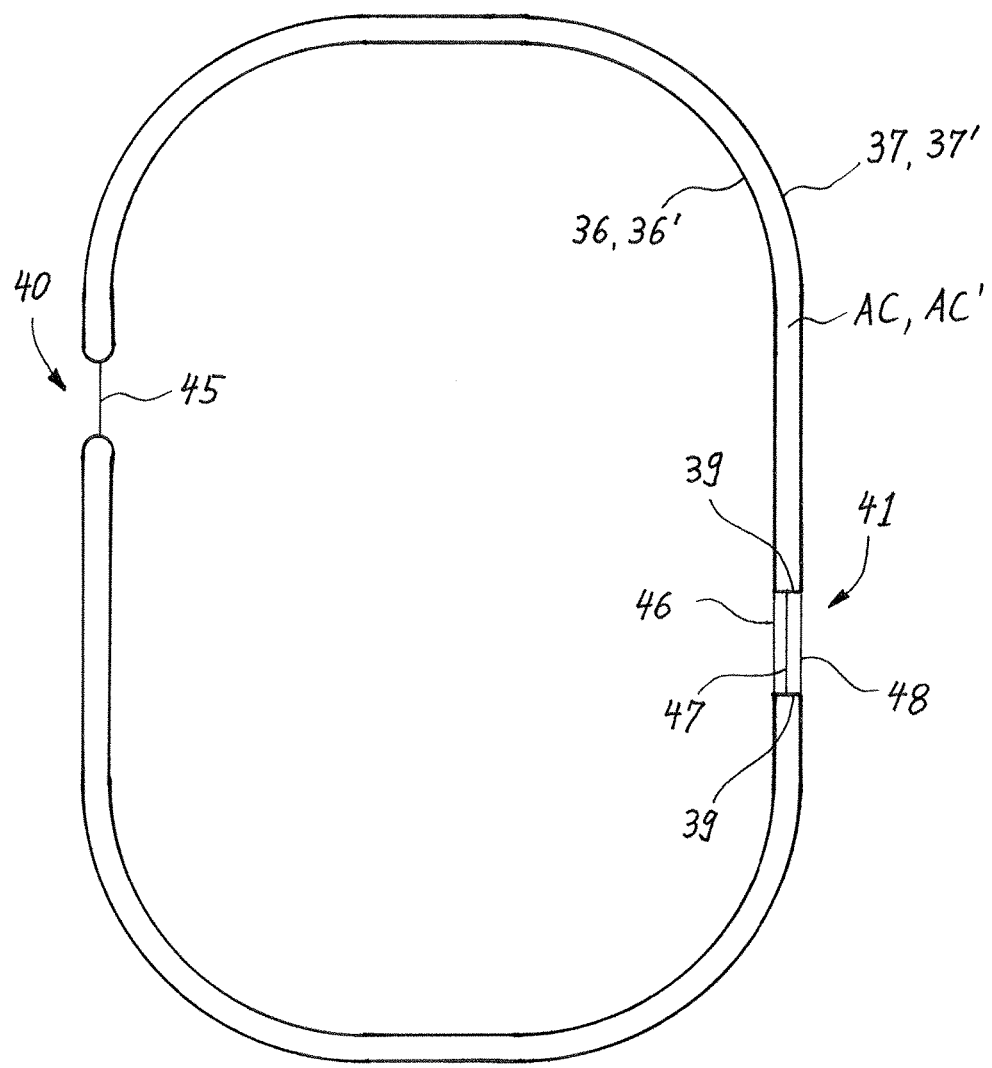

CONTROL DEVICE FOR THE COOLANT FLOW IN A COOLING CIRCUIT OF AN INTERNAL COMBUSTION ENGINE

RELATED APPLICATIONS

This application claims priority to DE 10 2016 108 227.9, filed on May 3, 2016, and DE 10 2016 116 361.9, filed on Sep. 1, 2016, the disclosures of which are fully incorporated herein with these references.

BACKGROUND

The invention is based on a control device for the coolant flow in a cooling circuit of an internal combustion engine having a housing with an inlet opening, an outlet opening, a channel extending from the inlet opening to the outlet opening and a movable control element for varying the flow-through cross section of the channel.

A control device of this type is known from DE 10 2006 038 213 A1 and comprises a seal arrangement that consists of a sliding ring of PTFE and a sealing ring of elastomeric material. The known control device comprises a control element, the sealing surface of which is spherical. On its side facing the control element, the sliding ring is shaped such that it is adapted to the spherical surface of the control element. The sealing surface of the sliding ring is relatively large and extends from the front side of the sliding ring up to its rear side that faces the sealing ring. The sealing ring not only has sealing properties, but also resilient properties, wherein its resilient force should only increase slightly when a deformation force acts upon the sealing element in order to allow a sound tolerance compensation. The sealing ring rests against the housing at multiple locations.

EP 2 295 757 A1 discloses a non-generic control device, in which a sealing surface of a seal arrangement resting against a control element and a sealing surface of the seal arrangement resting against a housing are realized on the same elastomeric component. A section of the seal arrangement, which comprises the sealing surface resting against the housing, is designed in the form of a sealing lip. In the closed position of the control element, a passage of the seal arrangement is connected to a downstream channel section. The inner and outer circumference of the sealing lip increase in the direction toward the housing. The seal arrangement is radially pressed against the wall of the control element from outside under the influence of the pressure of the coolant supplied through an inlet opening. Since the sealing surface of the seal arrangement resting against the control element consists of an elastomer, a high torque is required for moving the control element, particularly at a relatively high pressure differential between the inlet and the outlet. A drive unit for the control element therefore has to be dimensioned relatively strong.

SUMMARY

The control devices according to this disclosure can be distinguished in that the inlet and the outlet are interchanged such that the coolant flows through a seal arrangement thereof in different directions. The resulting pressure conditions on the seal arrangement are therefore also reversed and require a correspondingly adapted design of the seal arrangement. Designs using this inventive principle are adapted to the respective flow direction.

Regardless of the flow direction, control devices according to this disclosure comprise a housing with an inlet opening, an outlet opening, a channel extending from the inlet opening to the outlet opening and a movable control element for varying the flow-through cross section of the channel. The control device may comprise multiple inlet and/or outlet openings that are connected to one another by corresponding channels. An annular seal arrangement is seated between a sealing surface of the housing and a sealing surface of the control element. The seal arrangement has a flow-through passage and a circumferential direction extending around the passage. The passage may be connected to and extend a section of the channel. The annular seal arrangement may have any shape, for example oval or circular, along its circumference, i.e., when viewed along the flow direction of the coolant flowing through the passage, and/or may be curved, when viewed transverse to its passage. The control element can be moved relative to the seal arrangement between a closed position and an open position along its sealing surface. In its closed position, the control element can effect a pressure differential of the coolant between the inlet opening and the outlet opening from a higher pressure in an upstream channel section to a lower pressure in a downstream channel section, wherein the seal arrangement can be partially pressurized by the higher pressure and partially pressurized by the lower pressure of the coolant. In the closed position, the downstream channel section is blocked at least to such an extent that a pressure differential from the upstream channel section to the downstream channel section is produced in the coolant located in the channel and only an insignificant flow through the downstream channel section takes place. In this case, the seal arrangement is acted upon by the coolant under higher pressure from the upstream channel section and by the coolant under lower pressure from the downstream channel section. However, the control element may also completely separate an upstream channel section from a downstream channel section in the closed position. In the open position, the upstream channel section is connected to the downstream channel section via the passage in the seal arrangement, particularly via a through-opening in the control element. The control element may feature a wall, on which its sealing surface and in which its through-opening are arranged. The through-opening can be at least partially aligned with the passage of the seal arrangement by displacing the control element. The circumferential direction of the seal arrangement extends along the circumferential direction of a channel section in the housing.

The seal arrangement comprises a sealing frame and a sealing ring that is in fluid-tight contact with the sealing frame, particularly connected thereto in a fluid-tight fashion. For this purpose, the sealing frame may feature a circumferentially extending groove, in which the sealing ring is seated. The sealing frame has a sealing surface on its side facing the control element. The sealing surface extends, particularly annularly, in the circumferential direction of the seal arrangement. With respect to its shape, the sealing surface of the seal arrangement is adapted to the shape of the sealing surface of the control element and therefore may also be curved transverse to the circumferential direction of the seal arrangement. The sealing surface of the sealing frame rests against the sealing surface of the control element in a sealing fashion at least in the closed position thereof. The surface area of the sealing surface is defined as the area, in which the sealing frame and the control element contact one another in the closed position. In the open position, at least a section of the sealing surface of the sealing frame rests against the control element. The sealing ring fulfills a double function, namely a sealing function and a pressing function.

The sealing ring rests against the housing in a sealing fashion on its side facing away from the sealing frame. In the closed position of the closing element, the sealing ring resiliently presses the sealing surface of the sealing frame against the sealing surface of the control element. This is the reason why the sealing ring consists of a rubbery-elastic material such as, for example, ethylene-propylene-diene rubber (EPDM).

The sealing ring rests against a plane sealing surface of the housing in a sealing fashion. A surface section of the sealing ring, which is pressurized by the lower pressure in the closed position of the control element, and a section of the plane sealing surface of the housing, which is pressurized by the lower pressure in the closed position of the control element, meet and contact one another along a contact line extending in the circumferential direction of the seal arrangement. The aforementioned surface section of the sealing ring and the aforementioned section of the plane sealing surface both belong to the downstream channel section and are even connected to the downstream channel section in the closed position of the control element. A plane of projection extending along the plane sealing surface of the housing is defined for the further specification. The aforementioned contact line lies in the plane of projection and encloses a first surface area that also lies in the plane of projection. The contact line particularly may be closed, i.e., uninterrupted, in the circumferential direction. The sealing surface of the sealing frame is projected into the plane of projection perpendicular thereto and is bordered therein by an inner boundary line and an outer boundary line. The inner and the outer boundary line extend in the circumferential direction of the seal arrangement. The inner boundary line encloses a second surface area in the plane of projection. The outer boundary line encloses a third surface area in the plane of projection. If the sealing surface of the sealing frame is gapless in the circumferential direction, the inner and the outer boundary line are respectively also uninterrupted and continuous. In this case, the surface area of the sealing surface of the sealing frame, which is projected into the plane of projection perpendicular thereto, is calculated as the difference between the third surface area and the second surface area.

The sealing surface of the sealing frame may feature at least one gap in the circumferential direction. This gap may serve for preventing that the downstream channel section is completely separated from the upstream channel section in the closed position of the control element, but that a slight seepage flow from the upstream channel section into the downstream channel section rather can also take place in the closed position of the control element. This seepage flow may serve for ensuring that a thermostat arrangement in the downstream channel section is also continuously acted upon by a slight flow of coolant when the downstream channel section is blocked in principle. A thermostat arrangement in the downstream channel section could no longer fulfill its safety function without the seepage flow because the coolant in the downstream channel section could have cooled in this case due to prolonged stagnation. If the sealing surface of the sealing frame features a gap in the circumferential direction, the sealing surface projected into the plane of projection also contains a gap and neither its inner nor its outer boundary line is respectively closed in the circumferential direction. This is the reason why the region of the gap is respectively closed in such instances with an auxiliary line of minimal length extending in the plane of projection. A straight auxiliary line is placed at the narrowest point of the gap in the sealing surface of the sealing frame projected into the plane of projection in order to close the gap. The auxiliary line of minimal length is used for enclosing the second surface area together with the inner boundary line and for enclosing the third surface area together with the outer boundary line. If the gap in the sealing surface of the sealing frame projected into the plane of projection is shaped such that not only one single auxiliary line of minimal length exists, but multiple auxiliary lines of identical length rather can be placed in the gap, the auxiliary line, which encloses the smallest surface area together with the inner boundary line, is chosen for determining the second surface area and the auxiliary line, which encloses the largest surface area together with the outer boundary line, is chosen for determining the third surface area.

In a first inventive embodiment, the passage of the seal arrangement forms—in the closed position of the control element—part of the downstream channel section and consequently is also connected thereto. This means that the pressure on the inner circumference of the seal arrangement and in the passage is lower than on the outer circumference of the seal arrangement. The passage can therefore be pressurized by the coolant under lower pressure in the closed position of the control element. The sealing ring has a surface section that lies outside the passage, wherein the outer circumference of said surface section measured parallel to the plane of projection is no longer than the length of the aforementioned contact line between the sealing ring and the housing and may, in particular, be shorter than the length of this contact line. This outer surface section is therefore connected to the upstream channel section and the higher pressure acting therein, such that an inner surface section of the sealing ring is pressed against the plane sealing surface of the housing. The first surface area is designed smaller than the second surface area. The difference between the second surface area and the first surface area forms a pressure-active surface of the seal arrangement, which—in the closed position of the control element—effects the sealing frame to be pressed against the control element with increasing pressure as the pressure differential from the upstream channel section to the downstream channel section increases. On its side facing the passage, the sealing surface of the sealing frame may be bordered by an inner sealing edge of the sealing frame. The inner sealing edge, which is projected into the plane of projection perpendicular thereto, may form the inner boundary line of the second surface area. On its side facing the control element, the sealing frame may feature a step that forms the inner sealing edge. A surface section of the sealing frame, which is spaced apart from the sealing surface of the control element and forms an annular space, may be arranged adjacent to the step. The annular space extends in the circumferential direction of the seal arrangement and can be pressurized by the lower pressure in the closed position of the control element. The annular space is open toward the passage of the seal arrangement.

In a second inventive embodiment, the passage of the seal arrangement forms—in the closed position of the control element—part of the upstream channel section and consequently is also connected thereto. This means that the pressure on the inner circumference of the seal arrangement and in the passage is higher than on the outer circumference of the seal arrangement. The passage can therefore be pressurized by the coolant under higher pressure in the closed position of the control element. The sealing ring features an inner surface section with an inner circumference that is measured parallel to the plane of projection. The inner circumference is no shorter than the length of the aforementioned contact line between the sealing ring and the housing and may, in particular, be longer than the length of the aforementioned contact line. The inner surface section is connected to the upstream channel section and is pressed outward by the higher pressure acting therein, such that an outer surface section of the sealing ring is pressed against the plane sealing surface of the housing. The first surface area is designed larger than the third surface area. The difference between the first surface area and the third surface area forms a pressure-active surface of the seal arrangement. This pressure-active surface effects the sealing frame to be pressed against the control element with increasing pressure as the pressure differential from the upstream channel section to the downstream channel section increases in the closed position of the control element. On its side facing away from the passage, the sealing surface of the sealing frame may be bordered by an outer sealing edge of the sealing frame. The outer sealing edge, which is projected into the plane of projection perpendicular thereto, may form the outer boundary line that encloses the third surface area. On its side facing the control element, the sealing frame may feature a step that forms the outer sealing edge. A surface section of the sealing frame, which is spaced apart from the sealing surface of the control element and forms an annular space, may be arranged adjacent to the step. The annular space extends in the circumferential direction of the seal arrangement and can be pressurized by the lower pressure in the closed position of the control element. The annular space is connected to the downstream channel section, even in the closed position.

In both inventive embodiments, the surface areas are designed in such a way that the quotient of the pressure-active surface and the surface area of the sealing surface of the sealing frame, which is projected into the plane of projection perpendicular thereto, lies in the range between 0.7 and 1.3, particularly in the range between 1.0 and 1.2. If an annular space defined by a step on the sealing frame is provided, the annular space is in both instances arranged adjacent to the sealing edge facing the lower pressure and may be open toward the respective downstream channel section. The annular space may be defined, in particular, by a surface section of the sealing frame extending parallel to the sealing surface of the control element. The height of the annular space measured perpendicular to the sealing surface of the control element may amount to several tenths of a millimeter, particularly 0.2 mm to 0.8 mm.

This disclosure may provide (but which are not necessary) significant advantages:

The advantages of the two-part seal arrangement known from DE 10 2006 038 213 A1, which are based on its multipart design, are preserved: the sealing surface of the sealing frame may consist of a fluorinated plastic, which has excellent sliding properties relative to the control element. The sealing ring may consist of an elastomer. It seals the side of the seal arrangement facing the housing, on which no relative motion occurs.

The sealing ring may be designed in such a way that the elastic contact pressure of the sealing frame against the control element is very low, in particular, in order to ensure a sound tolerance compensation between the control element and the housing without excessive variations of the contact pressure due to tolerances.

The contact pressure of the sealing frame against the control element, which is required for sealing the upstream channel section relative to the downstream channel section when the control element is in the closed position, is primarily generated by the pressure differential between the upstream and the downstream channel sections. The pressure differential particularly acts upon the pressure-active surface and presses the sealing frame against the control element with increasing pressure as the pressure differential increases. According to this disclosure, the contact pressure is not unnecessarily high, but rather always just as high as required for producing the required seal. In this way, the forces required for moving the control element can be reduced and a drive unit provided for driving the control element can be simplified and have a lower rating, particularly with respect to its required maximum torque. The lowered contact pressure simultaneously reduces wear, particularly on the sealing surface of the sealing frame, and thereby also prolongs the service life of the inventive control device.

The sealing edges defining the sealing surface of the sealing frame may cause a defined contact of the sealing frame on the control element such that a defined contact area between the sealing frame and the control element is produced, wherein said contact area also does not significantly vary with respect to its size if the sealing surface is subjected to wear during the operation. The contact pressure conditions therefore also remain approximately constant if potential wear occurs.

The combination of the inventive criteria results in an excellent compromise between the partially contradicting requirements of a seal arrangement in all operating states and, in particular, creates clearly defined contact pressure conditions in the region of the seal arrangement. The static contact pressure of the sealing frame against the control element generated by the sealing ring can be very low as long as no pressure differential of the coolant has been produced. In this way, the sealing ring can compensate relatively large shape and/or size tolerances between the control element and the housing. The variation of the static contact pressure caused by these tolerances is at the same time very low such that the contact pressure of the sealing frame against the control element, which is generated due to the pressure differential being produced during the operation, also is only insignificantly affected by the existing tolerances between the control element and the housing.

The control device can largely tolerate particles such as, for example, molding sand, which may be present in the coolant, in particular, if the sealing edge facing the downstream channel section is formed by a step, adjacent to which an annular space between the sealing frame and the control element is arranged.

The seal arrangement can be very easily installed into the control device, in particular, if the sealing ring is connected to the sealing frame in order to thereby form a preassembled unit.

In one embodiment, the control element may be pivotable about an axis of rotation. The sealing surface of the control element may be rotationally symmetrical around the axis of rotation. The sealing surface of the control element particularly may have the shape of the circumferential surface of a circular cylinder. The seal arrangement may be oval in the circumferential direction. The passage of the seal arrangement may be realized in the form of an oblong hole. The sealing surface of the sealing frame may extend between an inner sealing edge and an outer sealing edge. The two sealing edges extend in the circumferential direction of the seal arrangement, particularly in an uninterrupted fashion along the entire circumference. The two sealing edges may define a width of the annular sealing surface of the sealing frame, which is completely covered by the sealing surface of the control element in the closed position thereof. The inner sealing edge and the outer sealing edge may define a minimal width of the sealing surface of the sealing frame. The width of the sealing surface of the sealing frame—measured transverse to the circumferential direction and parallel to the plane of projection—may lie between 1 mm and 3 mm, particularly between 1 mm and 2 mm. A width of 1.0 mm to 1.7 mm is suitable, and may particularly be constant along the circumference.

In another embodiment, a section of the sealing ring resting against the sealing surface of the housing may be designed in the form of a sealing lip. The sealing lip may—in a section oriented along the passage—have a thickness between 0.2 mm and 2 mm, particularly between 0.5 mm and 1 mm. The thickness of the sealing lip can be interpreted as the difference between an outer and an inner surface section. Measured in section, the sealing lip may have a length between 1 mm and 8 mm, particularly between 1 mm and 4 mm. A suitable length lies between 1 mm and 6 mm. In this way, a high elasticity of the sealing lip and a low elastic contact pressure of the sealing frame against the control element are ensured. It is simultaneously ensured that the sealing lip rests against the plane sealing surface of the housing in a well-sealed fashion. The direction, in which the sealing lip extends, is chosen in dependence on the pressure differential acting upon the seal arrangement. If the passage of the seal arrangement can be pressurized by the lower pressure and/or is connected to the downstream channel section, the inner circumference and the outer circumference of the sealing lip increase in the direction toward the plane of projection. If the passage of the seal arrangement can be pressurized by the higher pressure and/or is connected to the upstream channel section, the inner circumference and the outer circumference of the sealing lip decrease in the direction toward the plane of projection. This ensures that the sealing lip is always reliably pressed against the sealing surface of the housing due to the pressure differential being effected.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 2 shows a partially illustrated section through a first exemplary embodiment of a seal arrangement along the plane of section S indicated in FIG. 1;

FIG. 3 shows a second exemplary embodiment of a seal arrangement in the form of an illustration similar to FIG. 2;

FIG. 4 shows an enlarged detail of the seal arrangement according to FIG. 2;

FIG. 5 shows a top view of the seal arrangement according to FIG. 2;

FIG. 8 shows a schematic top view of a plane of projection.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

It shall be understood that in this disclosure terms such as "horizontal" and "vertical" are generally used to establish positions of individual components relative to one another rather than an absolute angular position in space. Further, regardless of the reference frame, in this disclosure terms such as "vertical," "parallel," "perpendicular," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "opening," "seal" and "channel," to name just a few, should be interpreted when appearing in this disclosure and claims to mean "one or more" or "at least one." All other terms used herein should be similarly interpreted unless it is made explicit that a singular interpretation is intended.

Figure 1:
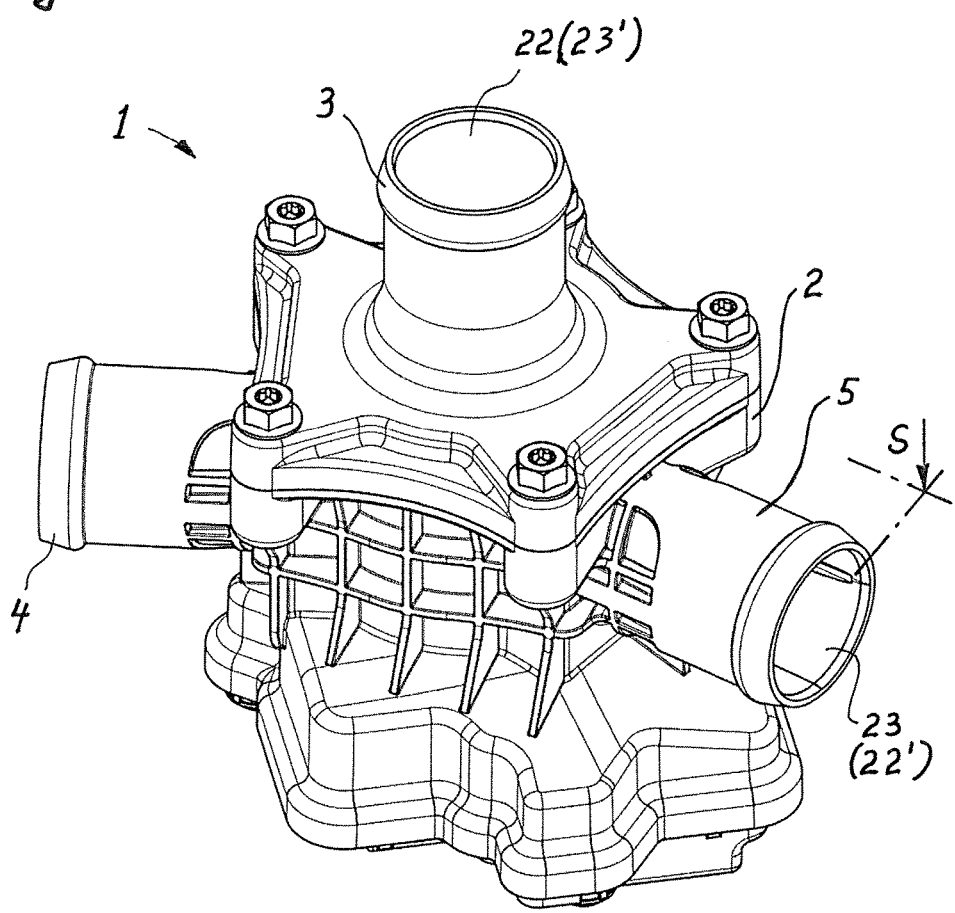
FIG. 1 shows a perspective view of an inventive control device.
Figure 7:
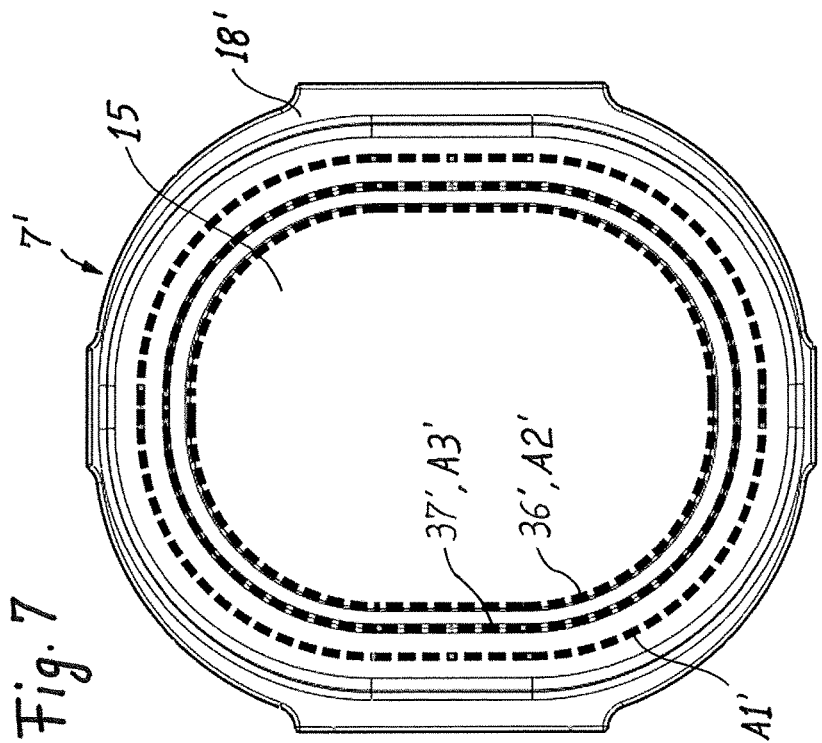
FIG. 7 shows a top view of the seal arrangement according to FIG. 3.
Figure 6:
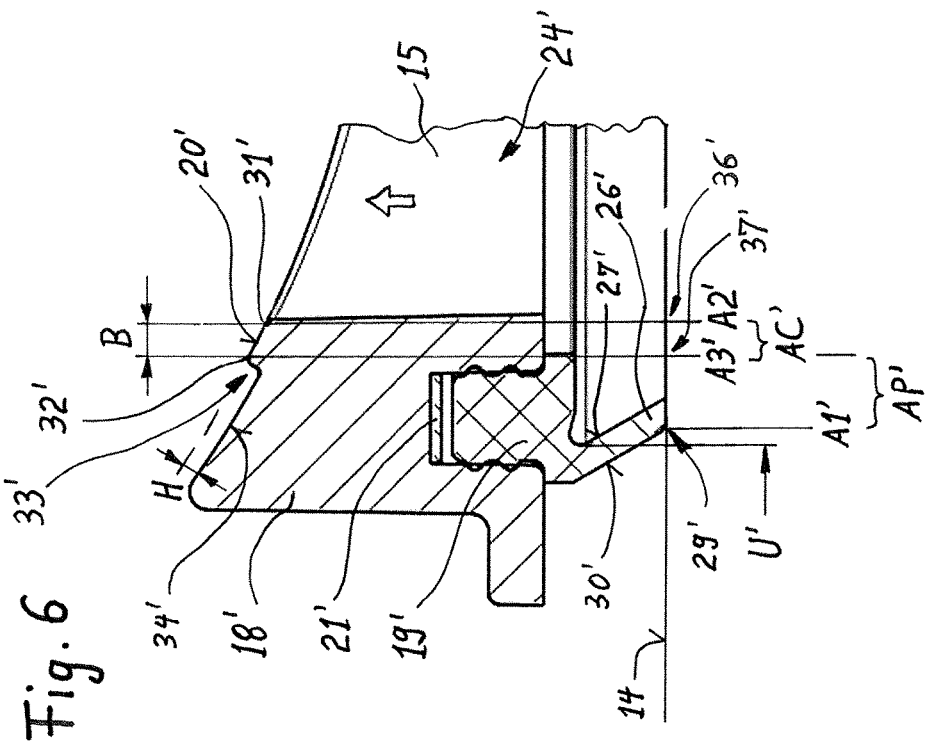
FIG. 6 shows an enlarged detail of the seal arrangement according to FIG. 3.

FIG. 1 shows a control device 1 for the coolant flow in a cooling circuit of an internal combustion engine, particularly in a motor vehicle. The control device 1 comprises a housing 2 with several coolant connection pipes 3, 4, 5. A movable control element 6 is arranged in the housing 2, but not visible in FIG. 1. The control element 6 has a circular-cylindrical shape and can be pivoted in the housing 2 by a not-shown drive unit in order to distribute or block the coolant flow between the coolant connection pipes 3, 4, 5. The coolant connection pipe 3 may comprise an inlet opening 22 or an outlet opening 23' depending on the requirements in the cooling circuit of the internal combustion engine. If the coolant connection pipe 3 comprises the inlet opening 22, the coolant connection pipes 4 and 5 may respectively comprise an outlet opening 23. A seal arrangement 7, which is described in greater detail below with reference to FIGS. 2, 4 and 5, is provided for such instances. The coolant connection pipe 3 may alternatively also comprise an outlet opening 23'. In this case, the coolant connection pipes 4 and 5 may respectively comprise an inlet opening 22'. A seal arrangement 7' suitable for such instances is illustrated in FIGS. 3, 6 and 7. Identical components or regions of the alternative seal arrangements 7 and 7' are—with the exception of the apostrophe—identified by the same reference symbols.

FIGS. 2 and 3 respectively show a section of the control element 6 that is arranged in the housing 2. The control element 6 has a circular-cylindrical wall 8 that is spaced apart from the wall 9 of the housing 2. The control element 6 is rotatable about a center axis extending perpendicular to the drawing plane of the figure. The interior of the control element 6 and the intermediate space 11 between the walls 8 and 9 are connected to the coolant connection 3. A sealing surface 12 of the control element 6 is arranged on the outer surface of the wall 8. The housing 2 comprises a plane sealing surface 13. An annular seal arrangement 7 or 7' is respectively seated between the sealing surfaces 12 and 13. An imaginary plane 14, which is referred to as "plane of projection," is defined on the plane sealing surface 13 for the following detailed description of the characteristics of the seal arrangement 7; 7'. The seal arrangement 7; 7' has a passage 15 that extends a channel section 16 of the coolant connection pipe 5. The control element 6 has a through-opening 17 in the wall 8 and the sealing surface 12. In the illustrations in FIGS. 2 and 3, the through-opening 17 is partially aligned with the passage 15 in the seal arrangement 7; 7'. The control element 6 is therefore in an open position, in which the interior 10 is connected to the channel section 16 via the through-opening 17 and the passage 15. The control element 6 can be pivoted clockwise into a closed position, in which it separates the interior 10 from the channel section 16. In the closed position, the flow through the coolant connection pipe 5 and the channel section 16 is respectively blocked.

The respective seal arrangement 7 or 7' comprises a sealing frame 18; 18' and a sealing ring 19; 19' connected thereto in a fluid-tight fashion. The sealing frame 18; 18' comprises a groove, into which the sealing ring 19; 19' is inserted in order to thereby ensure a fluid-tight connection between the sealing frame 18; 18' and the sealing ring 19; 19'. On its side facing the control element 6, the sealing frame 18; 18' features an annular sealing surface 20; 20', which rests against the sealing surface 12 of the control element 6 in a sealing fashion in the closed position thereof. The sealing surface 20; 20' is therefore curved transverse to the circumferential direction of the seal arrangement 7; 7' and adapted to the curved wall 8. The sealing ring 19; 19' rests against the plane sealing surface 13 of the housing 2 in a sealing fashion on the side of the seal arrangement 7; 7' facing away from the sealing frame 18; 18'. In the closed position and in the idle state, i.e., when no coolant pressure is produced yet, the sealing ring 19; 19' resiliently presses the sealing surface 20; 20' of the sealing frame 18; 18' against the sealing surface 12 of the control element 6. This resilient contact pressure is generated due to a slight deformation of the sealing ring 19; 19' during the assembly of the seal arrangement 7; 7' when the sealing ring 19; 19' is slightly compressed. The seal arrangement 7; 7' may comprise a reinforcement part 21, which may be designed, for example, in the form of a reinforcement sheet inserted into the groove of the sealing frame 18; 18', in order to stabilize the seal arrangement 7; 7'.

In the first exemplary embodiment illustrated in FIG. 2, the coolant connection pipe 3 comprises the inlet opening 22 and the coolant connection pipe 5 comprises the outlet opening 23; see also FIG. 1. The interior 10 and the intermediate space 11 form an upstream channel section 24, through which the coolant flows to the seal arrangement 7. In the closed position of the control element 6, the seal arrangement 7 is on its outer circumference subjected to a pressure, which corresponds to the pressure differential between the pressures acting in the channel sections 24 and 25, via the intermediate space 11 by the coolant present therein during the operation.

In the second exemplary embodiment illustrated in FIG. 3, the flow direction in the coolant connection pipe 5 is reversed. The coolant connection pipe 5 comprises an inlet opening 22' and the coolant connection pipe 3 comprises an outlet opening 23'; see also FIG. 1. Consequently, the coolant flows to the seal arrangement 7' through the coolant connection pipe 5 and the upstream channel section 24' formed therein. The interior 10 and the intermediate space 11 form the downstream section 25', which conveys the coolant to the outlet opening 23' in the coolant connection pipe 3. In the closed position of the control element 6, the pressure differential of the coolant between the channel sections 24' and 25' acts in the passage 15 of the seal arrangement 7', i.e., from the inside toward the outside.

FIGS. 2, 3, 4 and 6 show that the respective sealing ring 19 or 19' comprises a sealing lip 26 or 26', by means of which the sealing ring 19; 19' respectively rests against the sealing surface 13. The sealing lip 26; 26' comprises an inner surface section 27; 27' and an outer surface section 30; 30', which may extend approximately parallel. In the first exemplary embodiment illustrated in FIGS. 2 and 4, the direction, in which the sealing lip 26 extends, is chosen such that the inner circumference of the surface section 27 and the outer circumference U of the surface section 30 increase in the direction from the sealing frame 18 toward the plane of projection 14. The direction, in which the sealing lip 26' extends, is reversed in the second exemplary embodiment illustrated in FIGS. 3 and 6 such that the inner circumference U' of the surface section 27' and the outer circumference of the surface section 30' decrease toward the plane of projection 14. In both instances, the sealing lip 26; 26' is thereby pressed against the sealing surface 13 by the pressure acting in the upstream channel section 24; 24' in the closed position.

In both exemplary embodiments, a surface section 27 or 30', which is pressurized by the lower pressure and connected to the respective downstream channel section 25; 25', is respectively arranged on the sealing lip 26; 26'. A section 28; 28' of the sealing surface 13 of the housing 2, which is pressurized by the lower pressure and connected to the downstream channel section 25; 25', and the respective surface section 27 or 30' meet and contact one another along a respective contact line 29 or 29'. The contact lines 29; 29' respectively extend in the circumferential direction of the seal arrangement 7; 7' and lie in the plane of projection 14. Each of the contact lines 29 and 29' encloses a respective surface area A1 or A1' that lies in the plane of projection 14. In the first exemplary embodiment illustrated in FIGS. 2 and 4, the sealing lip 26 features an outer surface section 30, the outer circumference U of which measured parallel to the plane of projection 14 is shorter than the length of the contact line 29. The sealing lip 26' in the second exemplary embodiment illustrated in FIGS. 3 and 6 features an inner surface section 27', the inner circumference U' of which measured parallel to the plane of projection 14 is longer than the length of the contact line 29'. In this way, sound contact of the sealing lip 26; 26' on the sealing surface 13 is ensured even if the sealing lip 26; 26' only has a small thickness.

The respective sealing surface 20 or 20' of the sealing frames 7 and 7' extends between an inner sealing edge 31; 31' and an outer sealing edge 32; 32'. The sealing edges 31; 31', 32; 32' extend in the circumferential direction of the seal arrangement 7; 7' and respectively define a width B of the annular sealing surface 20; 20'. The width B of the sealing surface 20; 20' is completely covered by the sealing surface 12 of the control element in the closed position thereof. This results in a defined contact area that ensures a defined contact of the sealing frame 18; 18' on the control element 6 even at varying pressure differentials from the upstream channel section 24; 24' to the downstream channel section 25; 25'. The width B may lie between 1.3 mm and 1.5 mm. The actual sealing line during operation—which is defined as the circumferentially closed line of the highest surface pressure, which occurs between the sealing surface 12 of the control element 6 and the sealing surface 20; 20' during operation of the control device 1—therefore lies between the two sealing edges 31 and 32 or 31' and 32', respectively. The respective inner sealing edge 31 or 31' is projected into the plane of projection 14 perpendicular to the plane of projection 14 and thereby forms an inner boundary line 36 or 36', which respectively encloses a second surface area A2 or A2' lying in the plane of projection 14. The respective outer sealing edge 32 or 32' is analogously projected into the plane of projection 14 and thereby forms an outer boundary line 37 or 37', which respectively encloses a third surface area A3 or A3' in the plane of projection 14.

In the first exemplary embodiment illustrated in FIGS. 2 and 4, the inner sealing edge 31 is formed by a step 33 on the side of the sealing frame 18 facing the control element 6. A surface section 34, which is spaced apart from the sealing surface 12 of the control element 6, for example equidistantly by a distance H of 0.5 mm, is arranged adjacent to the step 33. An annular space 35 extending along the circumference of the seal arrangement 7 is formed between the surface section 34 and the sealing surface 12 of the control element 6 and is connected to the passage 15 and to the downstream section 25. According to this disclosure, the first surface area A1 is smaller than the second surface area A2. The difference A2 minus A1 forms a pressure-active surface AP of the seal arrangement 7, which—in the closed position of the control element 6—effects the sealing frame 18 to be pressed against the control element 6 with increasing pressure as the pressure differential from the upstream channel section 24 to the downstream channel section 25 increases.

In the second exemplary embodiment illustrated in FIGS. 3 and 6, the outer sealing edge 32' is formed by a step 33', wherein a surface section 34', which is spaced apart from the sealing surface 12 of the control element 6, for example equidistantly by a distance H of 0.5 mm, is arranged adjacent to said step 33'. An annular space 35' is formed between the surface section 34' and the sealing surface 12 and connected to the intermediate space 11 and to the downstream section 25'. According to this disclosure, the first surface area A1' is larger than the third surface area A3'. The difference A1' minus A3' forms a pressure-active surface AP' of the seal arrangement 7', which—in the closed position of the control element 6—effects the sealing frame 18' to be pressed against the control element 6 with increasing pressure as the pressure differential between the channel sections 24' and 25' increases.

In both exemplary embodiments of the seal arrangements 7 and 7', a quotient is formed of the pressure-active surface AP; AP' and the surface area AC; AC' of the sealing surface 20; 20' of the sealing frame 18; 18', which is projected into the plane of projection 14 perpendicular to the plane of projection 14, wherein said quotient may according to this disclosure lie in an exemplary range between 1.05 and 1.15. The surface area AC corresponds to the difference A3 minus A2 in the seal arrangement 7 and to AC'=A3'-A2' in the seal arrangement 7'.

FIG. 8 shows an essentially annular sealing surface 20; 20' of the respective sealing frame 18 or 18', which is projected into the plane of projection 14 and bordered by the inner boundary line 36; 36' and the outer boundary line 37; 37'. The plane of projection 14 corresponds to the drawing plane of FIG. 8. The sealing surface 20; 20' comprises two gaps that correspond to the gaps 40 and 41 of the sealing surface 20; 20' projected into the plane of projection. In order to determine the surface areas A2; A2' and A3; A3', the gaps 40, 41 are bridged with straight auxiliary lines. The gap 40 has a narrowest point that can be closed with a single auxiliary line 45 of minimal length. In this case, the second surface area A2; A2' is enclosed by the inner boundary line 36; 36' and the auxiliary line 45. The third surface area A3; A3' is enclosed by the outer boundary line 37, 37' and the auxiliary line 45. However, a narrowest point does not exist in the region of the gap 41. In this case, several auxiliary lines of identical length exist between the two parallel boundary lines 39, which respectively connect the inner boundary line 36; 36' to the outer boundary line 37; 37'. As an example, three potential auxiliary lines 46, 47 and 48 of identical length are illustrated between the two boundary lines 39. The auxiliary line 46, which encloses the smallest surface area together with the inner boundary line 36; 36', is chosen for determining the second surface area A2; A2'. The auxiliary line 48, which encloses the largest surface area together with the outer boundary line 37; 37', is chosen for determining the third surface area A3; A3'. The respective surface areas A2; A2' and/or A3; A3' determined with the aid of the auxiliary lines 45 and respectively 46 or 48 are used for calculating the pressure-active surface AP; AP'. The surface area AC; AC' is determined by the contact area between the sealing surface 12 of the control element 6 and the sealing surface 20; 20' of the sealing frame 18; 18' in the closed position. If gaps 40, 41 according to FIG. 8 are provided, the surface area AC; AC' is therefore reduced—at otherwise identical dimensions—in comparison with a circumferentially closed sealing surface 20; 20' according to FIGS. 5 and 7.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

| | LIST OF REFERENCE SYMBOLS |
|---|---|
| 1 | Control device |
| 2 | Housing |
| 3 | Coolant connection pipe |
| 4 | Coolant connection pipe |
| 5 | Coolant connection pipe |
| 6 | Control element |
| 7, 7' | Seal arrangement |
| 8 | Wall |
| 9 | Wall |
| 10 | Interior |
| 11 | Intermediate space |
| 12 | Sealing surface |
| 13 | Plane sealing surface |
| 14 | Plane of projection |
| 15 | Passage |
| 16 | Channel section |
| 17 | Through-opening |
| 18, 18' | Sealing frame |
| 19, 19' | Sealing ring |
| 20, 20' | Sealing surface |
| 21 | Reinforcement part |
| 22, 22' | Inlet opening |
| 23, 23' | Outlet opening |
| 24, 24' | Upstream channel section |
| 25, 25' | Downstream channel section |
| 26, 26' | Sealing lip |
| 27, 27' | Inner surface section |
| 28, 28' | Section |
| 29, 29' | Contact line |
| 30, 30' | Outer surface section |
| 31, 31' | Inner sealing edge |
| 32, 32' | Outer sealing edge |
| 33, 33' | Step |
| 34, 34' | Surface section |
| 35, 35' | Annular space |
| 36, 36' | Inner boundary line |

-continued

LIST OF REFERENCE SYMBOLS

| 37, 37' | Outer boundary line |
| 39 | Boundary line |
| 40 | Gap |
| 41 | Gap |
| 45 | Auxiliary line |
| 46 | Auxiliary line |
| 47 | Auxiliary line |
| 48 | Auxiliary line |
| A1, A1' | First surface area |
| A2, A2' | Second surface area |
| A3, A3' | Third surface area |
| AC, AC' | Surface area |
| AP, AP' | Pressure-active surface |
| B | Width |
| H | Distance |
| S | Plane of section |
| U, U' | Circumference |

What is claimed is:

1. A control device (1) for the coolant flow in a cooling circuit of an internal combustion engine with the following characteristics:
  a housing (2) with an inlet opening (22), an outlet opening (23), a channel (10, 11, 16) extending from the inlet opening (22) to the outlet opening (23) and a movable control element (6) for varying the flow-through cross section of the channel;
  an annular seal arrangement (7) is seated between a sealing surface (13) of the housing (2) and a sealing surface (12) of the control element (6), wherein said seal arrangement (7) has a flow-through passage (15) and a circumferential direction extending around the passage (15);
  the control element (6) can be moved relative to the seal arrangement (7) between a closed position and an open position along its sealing surface (12);
  the control element (6) can in its closed position effect a pressure differential from a higher pressure in an upstream channel section (24) to a lower pressure in a downstream channel section (25) between the inlet opening (22) and the outlet opening (23), wherein the seal arrangement (7) can be partially pressurized by the higher pressure and partially pressurized by the lower pressure;
  the upstream channel section (24) is connected to the downstream channel section (25) via the passage (15) in the open position of the control element (6);
  the seal arrangement (7) comprises a sealing frame (18) and a sealing ring (19) that is in fluid-tight contact with the sealing frame (18);
  the sealing frame (18) has a sealing surface (20) on its side facing the control element (6), wherein said sealing surface (20) rests against the sealing surface (12) of the control element (6) in a sealing fashion at least in the closed position thereof;
  the sealing ring (19) consists of a rubbery-elastic material, rests against the housing (2) in a sealing fashion on its side facing away from the sealing frame (18) and resiliently presses the sealing surface (20) of the sealing frame (18) against the sealing surface (12) of the control element (6) in the closed position thereof;
  wherein
  the sealing ring (19) rests against a plane sealing surface (13) of the housing (2) in a sealing fashion;
  a surface section (27) of the sealing ring (19), which can be pressurized by the lower pressure, and a section (28) of the plane sealing surface (13) of the housing (2), which can be pressurized by the lower pressure, meet and contact one another along a contact line (29) extending in the circumferential direction of the seal arrangement (7), wherein the contact line (29) lies in a plane of projection (14) extending along the plane sealing surface (13) of the housing (2) and encloses a first surface area (A1) lying in the plane of projection (14);
  the passage (15) of the seal arrangement (7) forms part of the downstream channel section (25);
  the sealing ring (19) has a surface section (30) that lies outside the passage (15), wherein the outer circumference (U) of said surface section (30) measured parallel to the plane of projection (14) is no longer than the length of the aforementioned contact line (29) between the sealing ring (19) and the housing (2);
  the sealing surface (20) of the sealing frame (18) is projected into the plane of projection (14) perpendicular to the plane of projection (14) and is bordered therein by an inner boundary line (36), which extends in the circumferential direction of the seal arrangement (7) and encloses a second surface area (A2) in the plane of projection (14);
  the inner boundary line (36) is, if the sealing surface (20) of the sealing frame (18) comprises a gap (40; 41) in the circumferential direction, closed in the region of the gap (40; 41) with an auxiliary line (45; 46) of minimal length extending in the plane of projection (14) in order to enclose the second surface area (A2), wherein the auxiliary line (46), which encloses the smallest surface area (A2) together with the inner boundary line (36), is chosen if several auxiliary lines (46, 47, 48) of identical length exist for bridging the gap (41);
  the first surface area (A1) is smaller than the second surface area (A2) and the difference between the second surface area (A2) and the first surface area (A1) forms a pressure-active surface (AP), which—in the closed position of the control element (6)—effects the sealing frame (18) to be pressed against the control element (6) with increasing contact pressure as the pressure differential from the upstream channel section (24) to the downstream channel section (25) increases;
  and the quotient of the pressure-active surface (AP) and the surface area (AC) of the sealing surface (20) of the sealing frame (18), which is projected into the plane of projection (14) perpendicular to the plane of projection (14), lies in the range between 0.7 and 1.3.

2. The control device according to claim 1 with the following additional characteristics:
  the sealing surface (20) of the sealing frame (18) is on its side facing the passage (15) bordered by an inner sealing edge (31) of the sealing frame (18);
  the inner boundary line (36) is formed by the inner sealing edge (31), which is projected into the plane of projection (14) perpendicular to the plane of projection (14).

3. The control device according to claim 2 with the following additional characteristics:
  the sealing frame (18) features a step (33) forming the inner sealing edge (31) on its side facing the control element (6);
  a surface section (34) of the sealing frame (18), which is spaced apart from the sealing surface (12) of the control element (6) and forms an annular space (35), is arranged adjacent to the step (33), wherein said annular space extends in the circumferential direction of the seal arrangement (7) and can be pressurized by the lower pressure in the closed position of the control element (6).

4. The control device according to claim 1, in which the quotient lies in the range between 1.0 and 1.2.

5. The control device according to claim 1, in which the sealing surface (20; 20') of the sealing frame (18; 18') extends between an inner sealing edge (31; 31') and an outer sealing edge (32; 32'), which respectively extend in the circumferential direction of the seal arrangement (7; 7'), particularly in an uninterrupted fashion along the entire circumference.

6. The control device according to claim 1, in which the inner sealing edge (31; 31') and the outer sealing edge (32; 32') define a minimal width (B) of the sealing surface (20; 20') of the sealing frame (18; 18'), which is measured parallel to the plane of projection (14) and lies between 1 mm and 3 mm.

7. The control device according to claim 1, in which the control element (6) is pivotable about an axis of rotation and the sealing surface (12) of the control element (6) extends rotationally symmetrical around the axis of rotation.

8. The control device according to claim 1, in which the sealing surface (12) of the control element (6) has the shape of the circumferential surface (12) of a circular cylinder.

9. The control device according to claim 1, in which a section of the sealing ring (19; 19') resting against the sealing surface (13) of the housing (2) is designed in the form of a sealing lip (26; 26').

10. The control device according to claim 9, in which the inner circumference and the outer circumference (U) of the sealing lip (26) increase in the direction toward the plane of projection (14).

11. A control device (1) for the coolant flow in a cooling circuit of an internal combustion engine with the following characteristics:
    a housing (2) with an inlet opening (22'), an outlet opening (23'), a channel (10, 11, 16) extending from the inlet opening (22') to the outlet opening (23') and a movable control element (6) for varying the flow-through cross section of the channel;
    an annular seal arrangement (7') is seated between a sealing surface (12) of the housing (2) and a sealing surface of the control element (6), wherein said seal arrangement (7') has a flow-through passage (15) and a circumferential direction extending around the passage (15);
    the control element (6) can be moved relative to the seal arrangement (7') between a closed position and an open position along its sealing surface (12);
    the control element (6) can in its closed position effect a pressure differential from a higher pressure in an upstream channel section (24') to a lower pressure in a downstream channel section (25') between the inlet opening (22') and the outlet opening (23'), wherein the seal arrangement (7') can be partially pressurized by the higher pressure and partially pressurized by the lower pressure;
    the upstream channel section (24') is connected to the downstream channel section (25') via the passage (15) in the open position of the control element (6);
    the seal arrangement (7') comprises a sealing frame (18') and a sealing ring (19') that is in fluid-tight contact with the sealing frame (18');
    the sealing frame (18') has a sealing surface (20') on its side facing the control element (6), wherein said sealing surface (20') rests against the sealing surface (12) of the control element (6) in a sealing fashion at least in the closed position thereof;
    the sealing ring (19') consists of a rubbery-elastic material, rests against the housing (2) in a sealing fashion on its side facing away from the sealing frame (18') and resiliently presses the sealing surface (20') of the sealing frame (18') against the sealing surface (12) of the control element (6) in the closed position thereof;
    wherein
    the sealing ring (19') rests against a plane sealing surface (13) of the housing (2) in a sealing fashion;
    a surface section (30') of the sealing ring (19'), which can be pressurized by the lower pressure, and a section (28') of the plane sealing surface (13) of the housing (2), which can be pressurized by the lower pressure, meet and contact one another along a contact line (29') extending in the circumferential direction of the seal arrangement (7'), wherein the contact line (29') lies in a plane of projection (14) extending along the plane sealing surface (13) of the housing (2) and encloses a first surface area (A1') lying in the plane of projection (14);
    the passage (15) of the seal arrangement (7') forms part of the upstream channel section (24');
    the sealing ring (19') has a surface section (27') that lies inside the passage (15), wherein the inner circumference (U') of said surface section (27') measured parallel to the plane of projection (14) is no shorter than the length of the aforementioned contact line (29') between the sealing ring (19') and the housing (2);
    the sealing surface (20') of the sealing frame (18') is projected into the plane of projection (14) perpendicular to the plane of projection (14) and is bordered therein by an outer boundary line (37'), which extends in the circumferential direction of the seal arrangement (7') and encloses a third surface area (A3') in the plane of projection (14);
    the outer boundary line (37') is, if the sealing surface (20') of the sealing frame (18') comprises a gap (40; 41) in the circumferential direction, closed in the region of the gap (40; 41) with an auxiliary line (45; 48) of minimal length extending in the plane of projection (14) in order to enclose the third surface area (A3'), wherein the auxiliary line (48), which encloses the largest surface area (A3') together with the outer boundary line (37'), is chosen if several auxiliary lines (46, 47, 48) of identical length exist for bridging the gap (41);
    the first surface area (A1') is larger than the third surface area (A3') and the difference between the first surface area (A1') and the third surface area (A3') forms a pressure-active surface (AP'), which—in the closed position of the control element (6)—effects the sealing frame (18') to be pressed against the control element (6) with increasing contact pressure as the pressure differential from the upstream channel section (24') to the downstream channel section (25') increases;
    and the quotient of the pressure-active surface (AP') and the surface area (AC') of the sealing surface (20') of the sealing frame (18'), which is projected into the plane of projection (14) perpendicular to the plane of projection (14), lies in the range between 0.7 and 1.3.

12. The control device according to claim 11 with the following additional characteristics:
    the sealing surface (20') of the sealing frame (18') is on its side facing away from the passage (15) bordered by an outer sealing edge (32') of the sealing frame (18');

the outer boundary line (37') is formed by the outer sealing edge (32'), which is projected into the plane of projection (14) perpendicular to the plane of projection (14).

13. The control device according to claim 12 with the following additional characteristics:

the sealing frame (18') features a step (33') forming the outer sealing edge (32') on its side facing the control element (6);

a surface section (34') of the sealing frame (18'), which is spaced apart from the sealing surface (12) of the control element (6) and forms an annular space (35'), is arranged adjacent to the step (33'), wherein said annular space (35') extends in the circumferential direction of the seal arrangement (7') and can be pressurized by the lower pressure in the closed position of the control element (6).

14. The control device according to claim 11, in which the quotient lies in the range between 1.0 and 1.2.

15. The control device according to claim 11, in which the sealing surface (20; 20') of the sealing frame (18; 18') extends between an inner sealing edge (31; 31') and an outer sealing edge (32; 32'), which respectively extend in the circumferential direction of the seal arrangement (7; 7'), particularly in an uninterrupted fashion along the entire circumference.

16. The control device according to claim 15, in which the inner sealing edge (31; 31') and the outer sealing edge (32; 32') define a minimal width (B) of the sealing surface (20; 20') of the sealing frame (18; 18'), which is measured parallel to the plane of projection (14) and lies between 1 mm and 3 mm.

17. The control device according to claim 11, in which the control element (6) is pivotable about an axis of rotation and the sealing surface (12) of the control element (6) extends rotationally symmetrical around the axis of rotation.

18. The control device according to claim 17, in which the sealing surface (12) of the control element (6) has the shape of the circumferential surface (12) of a circular cylinder.

19. The control device according to claim 11, in which a section of the sealing ring (19; 19') resting against the sealing surface (13) of the housing (2) is designed in the form of a sealing lip (26; 26').

20. The control device according to claim 19, in which the inner circumference (U') and the outer circumference of the sealing lip (26') decrease in the direction toward the plane of projection (14).

\* \* \* \* \*